United States Patent
Dusi et al.

(10) Patent No.: US 10,069,675 B2
(45) Date of Patent: Sep. 4, 2018

(54) METHOD FOR OPERATING A DISTRIBUTED COMPUTING SYSTEM AND A DISTRIBUTED COMPUTING SYSTEM

(71) Applicant: NEC EUROPE LTD., Heidelberg (DE)

(72) Inventors: Maurizio Dusi, Gadesco Pieve Delmona (IT); Francesco Gringoli, Brescia (IT); Paolo Laffranchini, Desenzano del Garda (IT)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 14/905,830

(22) PCT Filed: Aug. 30, 2013

(86) PCT No.: PCT/EP2013/068013
§ 371 (c)(1),
(2) Date: Jan. 18, 2016

(87) PCT Pub. No.: WO2015/028088
PCT Pub. Date: Mar. 5, 2015

(65) Prior Publication Data
US 2016/0164716 A1    Jun. 9, 2016

(51) Int. Cl.
*H04L 12/24* (2006.01)
*G06F 11/16* (2006.01)
(Continued)

(52) U.S. Cl.
CPC ...... *H04L 41/0668* (2013.01); *G06F 11/1658* (2013.01); *G06F 11/2048* (2013.01);
(Continued)

(58) Field of Classification Search
CPC ..... H04L 41/0668; H04L 41/12; H04L 43/10; H04L 67/10; G06F 11/1658; G06F 11/2048; G06F 11/2023; G06F 11/2041
See application file for complete search history.

(56) References Cited

U.S. PATENT DOCUMENTS

| 7,389,300 | B1 | 6/2008 | Shah et al. |
| 2003/0026241 | A1* | 2/2003 | Ono ........................ H04L 45/04 370/349 |

(Continued)

FOREIGN PATENT DOCUMENTS

WO    WO 2005050404 A2    6/2005

*Primary Examiner* — Ajay Cattungal
(74) *Attorney, Agent, or Firm* — Leydig, Voit & Mayer, Ltd.

(57) ABSTRACT

A method for operating a distributed computing system including a plurality of nodes connected in a general network topological sequential manner includes storing a first message on a first node; removing the first message from the first node only if an N-level acknowledgement message is received by the first node indicating that a second message based on the data of the first message was successfully received by a second node on a second level, wherein the difference between the values for the first and second level is a predefined value N; and saving a node state of at least the second node or a third node on a level higher than the first level before sending out an acknowledgement message to a node on a level below if an outgoing message towards the second node is generated based on the node state.

13 Claims, 5 Drawing Sheets

(51) Int. Cl.
*H04L 12/26* (2006.01)
*H04L 29/08* (2006.01)
*G06F 11/20* (2006.01)

(52) U.S. Cl.
CPC .............. *H04L 41/12* (2013.01); *H04L 43/10* (2013.01); *H04L 67/10* (2013.01); *G06F 11/2023* (2013.01); *G06F 11/2041* (2013.01)

(56) References Cited

U.S. PATENT DOCUMENTS

| | | | | |
|---|---|---|---|---|
| 2005/0220054 | A1* | 10/2005 | Meier | G06Q 20/3674 370/331 |
| 2009/0327807 | A1* | 12/2009 | Varadarajan | G06F 11/1438 714/15 |
| 2010/0118776 | A1* | 5/2010 | Iwasa | H04L 45/72 370/328 |
| 2011/0071981 | A1 | 3/2011 | Ghosh et al. | |
| 2012/0178438 | A1* | 7/2012 | Vashi | H04W 24/10 455/424 |
| 2014/0355604 | A1* | 12/2014 | Mutschler | H04L 47/10 370/390 |

\* cited by examiner

METHOD FOR OPERATING A DISTRIBUTED COMPUTING SYSTEM AND A DISTRIBUTED COMPUTING SYSTEM

CROSS REFERENCE TO RELATED APPLICATIONS

This application is a U.S. National Stage Application under 35 U.S.C. § 371 of International Application No. PCT/EP2013/068013 filed on Aug. 30, 2013. The International Application was published in English on Mar. 5, 2015 as WO 2015/028088 A1 under PCT Article 21(2).

FIELD

The present invention relates to a method for operating a distributed computing system comprising a plurality of nodes, wherein the nodes are connected in a general network topological sequential manner resulting in M-levels, wherein M is a natural number greater than or equal to 3, and wherein each level at least comprises at least one node. The present invention relates also to a distributed computing system comprising a plurality of nodes, wherein the nodes are connected in a general network topological sequential manner resulting in M-levels, wherein M is a natural number greater than or equal to 3, and wherein each level at least comprises at least one node.

BACKGROUND

Distributed computing systems are in particular designed for enabling parallel computation. A given application is seen as a topology of nodes, each of them executing tasks. Messages passing or exchanging between nodes ensure that the data flows through the topology and input data are processed in such a way to produce the needed output data. Examples of distributed computing systems are Hadoop, which is batch-oriented and Storm, which is stream-oriented.

Most of the distributed computing systems have to be highly available for a certain time period during the day, e.g. a stock exchange ordering computing system or even 24/7, e.g. a super computing cluster. Therefore one of the major problems faced with distributed computing systems is node failure. Whenever a node fails, two actions usually are required: First there is the need to restore the status of the node before the failure on a new node. Second, there is a need to update the topology of the application so that data can flow through the new node, i.e. the node that has replaced the one that failed. After completion of these two actions, computation can resume and continue.

To overcome this problem conventional solutions provide a recovery from the node failure at the expense of an increased number of resources being used, in terms of network input/output, central processing unit resources and memory resources as well as spare nodes that have to be kept available.

These conventional techniques comprise for example an instantiation of a new topology and restarting the whole computation from the beginning on the initial input data. Such a conventional technique is the default one adopted by Storm. Another conventional technique applies redundant computation techniques, such as active or passive standby. In active standby for example the distributed computing system launches the same task on multiple nodes and the results of the task can be taken from a redundant node in case of node failure. In passive standby the status of a node including the status of all its output queues is copied to other backup nodes, which stay idle and eventually replace the node in case it leaves the distributed computing system, in particular in case of a failure.

Further a conventional technique is the so-called upstream backup technique, adopted by the platform Borealis. Given the topology according to FIG. 1 in where a node a is connected to a node b and a node b is connected to node c in a sequential manner, in the upstream backup technique the node a keeps messages for the node b until the node c receives the output messages computed by node b. The node b therefore maintains information about the relations of all <input, output> messages: The node b waits for an acknowledgement from node c about a given output message that node b sent to node c before sending an acknowledgement related to the corresponding input message to node a. At this point node a removes the acknowledged message from its output queue. In case of a failure a new node with clean state/status takes over, and the status before the failure is recomputed by replying all messages held by the upstream node a.

However one of the drawbacks is, that there is no way to pick up a computation right where it was left in case of a failure without introducing expensive redundancy and strategies to choose which tasks have to be duplicated.

SUMMARY

In an embodiment, the present invention provides a method for operating a distributed computing system. The distributed computing system includes a plurality of nodes, the nodes are connected in a general network topological sequential manner resulting in M-levels, wherein M is a natural number greater than or equal to 3, and each level includes at least one node. The method includes, when sending data in messages via nodes on different levels, storing on a first node, a first message which was sent by the first node; removing the first message from the first node only if an N-level acknowledgement message is received by the first node indicating that a second message based on the data of the first message was successfully received by a second node on a second level, wherein the difference between the values for the first and second level is a predefined value N, wherein N is a natural number smaller than or equal to the maximum number of levels between the first and second level; and saving a node state of at least the second node or a third node on a level higher than the first level before sending out an acknowledgement message to a node on a level below if an outgoing message towards the second node is generated based on the node state.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
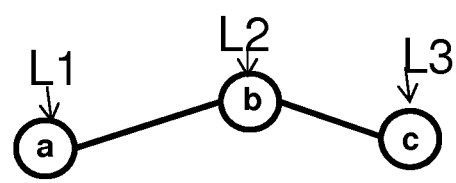
FIG. 1 shows a topology for computing nodes in a conventional distributed computing system.

According to an embodiment, the present invention provides a method for operating a distributed computing system and a distributed computing system which do not require the use of redundant computation techniques.

According to an embodiment, the present invention provides a method for operating a distributed computing system and a distributed computing system which enable resuming the computation without the need of restarting a computation from initial data.

According to an embodiment, a method for operating a distributed computing system is defined, comprising a plurality of nodes, wherein the nodes are connected in a general network topological sequential manner resulting in M-levels, wherein M is a natural number greater than or equal to 3, and wherein each level comprises at least one node.

According to an embodiment, the method is characterized in that when sending data in messages via nodes on different levels, a corresponding message which was sent by a first node is stored on first node and only removed from the first node if a N-level acknowledgement message is received by the first node indicating that a second message based on the data of the first message was successfully received by a second node on a second level, wherein the difference between the values for the first and second level is a predefined value N, wherein N is a natural number which smaller than or equal to the maximum number of levels between the first and second level and that a node state of at least the node on a level higher than the level of the first level is saved before sending out an acknowledgement message to the node on a level below, if an outgoing message towards the second node is generated based on the node state of at least one node.

According to an embodiment, a distributed computing system is defined, comprising a plurality of nodes, wherein the nodes are connected in a general network topological sequential manner resulting in M-levels, wherein M is a natural number greater than or equal to 3, and wherein each level at least comprises at least one node.

According to an embodiment, the distributed computing system is characterized in that the one or more nodes are operable to send data in messages via nodes on different levels, wherein a corresponding message sent by a first node is stored on first node and only removed from the first node if a N-level acknowledgement message is received by the first node indicating that a second message based on the data of the first message was successfully received by a second node on a second level, wherein the difference between the values for the first and second level is a predefined value N, wherein N is a natural number which smaller than or equal to the maximum number of levels between the first and second level and that a node state of at least the node on a level higher than the level of the first level is saved before sending out an acknowledgement message to the a node on a level below, if an outgoing message towards the second node is generated bases on the node state of the at least one node.

According to an embodiment of the invention it has been recognized that in case of a failure computation may be picked up right where it was left without using expensive redundancy and strategies for choosing tasks to be duplicated.

According to an embodiment of the invention it has been further recognized that the method for operating the distributed computing system and the distributed computing system enable a fast resuming and saving of network input/output and CPU consumption providing high availability.

According to an embodiment of the invention it has been further recognized that robustness of a failure of N adjacent computing nodes is provided.

According to an embodiment of the invention it has been further recognized that the robustness in terms of the parameter N is flexible respectively configurable.

According to an embodiment of the invention it has been further recognized that no coordination between the checkpoints of individual nodes is required.

According to an embodiment of the invention it has been further recognized that the present invention is also flexible with regard to further application areas, in particular the present invention may be applied to the chain replication area.

The term "message" is to be understood in the most general sense. A "message" may be in particular a data packet or a certain amount of data, which can be sent, exchanged or received preferably by a node.

An embodiment of the present invention combines a multi-level acknowledgement system and a check pointing technique, wherein by means of check pointing the status of a node is saved but not the messages that flow through the node itself. The status of this node can be restored on a new node in case of a failure. By means of the multi-level acknowledgement system the topology is made robust towards a failure of N consecutive nodes wherein the number N is configurable and maps directly to the chosen level of the acknowledgement system. Even when adopting upstream backup technique, the internal variables of the failed node would be lost, a new node with clean state replacing the failed node must process again messages that have been previously processed by the failed node to reconstruct the state of the failed node on the new node, i.e. the values of all internal variables, before resuming and continuing with the computation.

According to a preferred embodiment for every transmitted message between nodes in adjacent levels a 0-level acknowledgement message is provided to the one or more nodes which sent out the message. This enables in an easy way to provide the N-level acknowledgement message throughout the levels and ensures that a source node receives information about a successful retrieval of the message sent out in every level.

According to a further preferred embodiment upon detection of a failure of at least one of the N nodes the saved node state is restored on a spare node replacing the failed node and the nodes on the adjacent lower level are providing their stored messages to the spare node. This enables a fast and reliable resuming with the computation on the spare node in case of a failure of the corresponding node.

According to a further preferred embodiment failure of a node is detected by a heartbeat protocol and/or by expiration of a timeout on receiving acknowledgement messages for sent messages. A heartbeat protocol tests periodically if a node is responding outside the "normal" messages, i.e. an active failure detection is enabled. The time between the "heartbeats" is configurable and may be adapted according to the underlying system, for example corresponding periods for the "heartbeat" may be in- or decreased accordingly.

When using an expiration of a timeout on receiving acknowledgement messages a passive failure detection of a node is provided avoiding unnecessary traffic between the nodes and computation resources are reduced compared to the heartbeat protocol. The active as well as passive failure detection provides a robust a reliable way of a node failure detection procedure.

According to a further preferred embodiment neighbor nodes of the failed node are informed about the failure and traffic redirection to the spare node is initiated, preferably starting from messages for which no acknowledgement was received. This enables a redirection of the messages dedicated for the failed node to the spare node providing a fast and a reliable resuming of the computation by the spare node.

According to a further preferred embodiment the spare node sends an acknowledgement message to a node on an adjacent lower level related to the last message being part of the saved node state. This prevents that messages are resent that are already part of the current checkpoint respectively node state but the failed node could not acknowledge them because node failed right after the saving of the node state/checkpoint but right before sending the acknowledgement messages.

According to a further preferred embodiment saving of a node state is performed periodically and/or incrementally. By saving a node state periodically a reliable check pointing is provided independent of any event. When the node state is additionally or alternatively saved incrementally, i.e. only the differences between the previous node state and the current node state is saved; computation resources for saving can be reduced.

According to a further preferred embodiment the node state is saved on a distributed storage system, preferably at least the node state of the first node. For example if the first node fails and the output queue of the first node/the head node was not empty upon failing, anyway the node state of the head node/first node is safely stored and can be replicated in case of a failure.

According to a further preferred embodiment cumulative acknowledgement messages are sent when saving a node state. Upon check pointing/saving of a node state the cumulative acknowledgements may be used to save bandwidth and reduce the amount of messages being exchanged between nodes. Preferably the cumulative acknowledgement messages may be used in the following way: Upon check pointing and after receiving a certain number of messages—say 10—the node which saves its state may send an acknowledgement message only for the last message, i.e. the tenth, received by the node to the sending node. The sending node interprets this acknowledgement message for the tenth message as acknowledgement that all messages here from the first to the tenth message have been received successfully. The sending node then deletes all the messages—here the 10 messages—from its output queue.

According to a further preferred embodiment the first node is provided in a redundant manner. Redundant manner means that for the first node a very high level of robustness is provided, for example by additional conventional techniques like active or passive standby ensuring that a failure of the head node/first node for retrieving all initial data does not fail respectively is very unlikely.

According to a further preferred embodiment a node saves the incoming message with data triggering a generation of an output message based on the data of the received incoming messages for the output message. This enables not to maintain a lot of input/output-mapping relations since input/output message relations are usually very complex, need a lot of memory and slow down computation by the distributed computing system. In other words only the last incoming message, i.e. the one that triggers the output message, is saved since the previous ones are part of the internal status of the node.

According to a further preferred embodiment upon receiving a Y-level acknowledgement message from a node in an adjacent higher level X+1 the node in the level X checks whether all messages send out to nodes in the adjacent higher level have been acknowledged and if yes a Y+1-level acknowledgement message is provided to the one or more nodes on the adjacent lower level X−1 when the state of the node in level X has been saved. For example when receiving a 2-level acknowledgement message from a node in level 3 the node in level 2 checks whether all messages sent out to nodes in level 3 have been acknowledged and if yes a 3-level acknowledgement message is provided to the one or more nodes in the adjacent lower level 1. This enables that upon receiving a corresponding Y-level acknowledgement message the corresponding node on this level can safely remove the messages from its output queue without sacrificing robustness and high availability.

According to a further preferred embodiment the node state of a node is saved before providing an acknowledgement message to a node on a lower level. This provides in any case before providing an acknowledgement messages further down to nodes on lower levels, that the node state is saved in case of a failure of the node. The message generated from the node on the lower level is not removed then and if a spare node for the failed node is provided, the messages in the output queue of the node in the lower level are still in the output queue of this node. Since the node state of the failed node was saved, a spare node can resume the computation from there after migrating the node state and re-send the messages in the output queue of the node in the lower level.

According to a further preferred embodiment message identification information provided by a sending node is used for checking. This enables an easy as well as easy-to-implement control if for example a plurality of messages was sent out by a sending node to check whether then have been successfully received. For example a counter of the number of downstream nodes can be implemented that have acknowledged the message from an upstream node with a certain message identification. If the message with the certain identification information has been acknowledged by all the said involved downstream nodes, checking is successful and a corresponding acknowledgement message is provided to the upstream node(s).

FIG. 1 shows a topology for computing nodes in a conventional distributed computing system.

In FIG. 1 a node a is connected to a node b and a node b is connected to node c in a sequential manner in the conventional upstream backup technique the node a keeps messages for the node b until the node c which is the output messages computed by node b. The node b therefore maintains information about the relations of all <input, output> messages: The node b waits for an acknowledgement from node c about a given output message that node b sent to node c before sending an acknowledgement related to the corresponding input message to node a. At this point node a removes the acknowledged message from its output queue. In case of a failure a new node with clean state takes over, and the status before the failure is recomputed by replying all messages held by the upstream node a.

No node status or node state is saved; therefore computation cannot resume where it was left in case of a failure.

All internal variables of the failed node are lost and the new node with clean state must process messages that have been previously processed by the failed node to reconstruct the node state before resuming and continuing with the computation.

Figure 2:
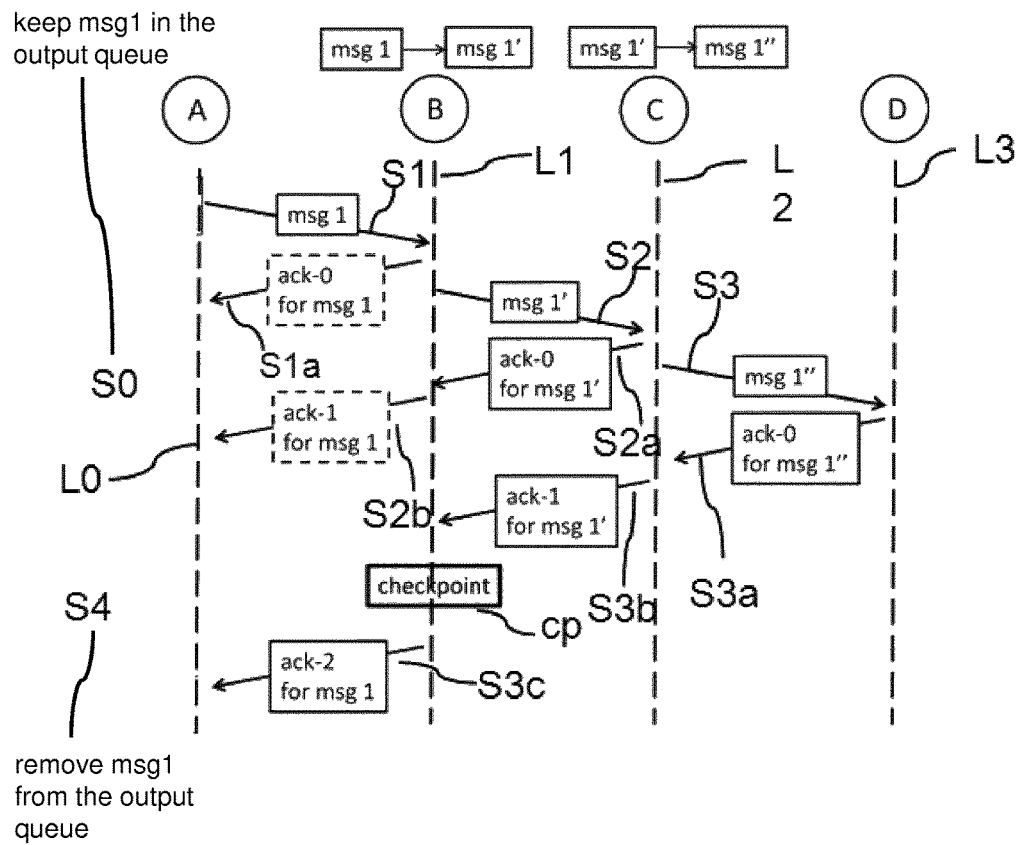
FIG. 2 shows a message flow of a method according to a first embodiment of the present invention.

FIG. 2 shows a message flow of a method according to a first embodiment of the present invention.

In FIG. 2 the message flow for an acknowledgement system of level 2 and with a check point procedure is shown. Upon arrival of a 2-level acknowledgement the corresponding node A can safely remove the message from its output queue. At this point even if node B fails the message generated from node A has turned in the message 1", which is in the output queue of the node C and node D has a copy of it is well. There is no need for node A to have it on its output queue anymore. Instead all subsequent messages, for example message msg2 and on are still in the output queue of node A and the node state of node B has been checkpointed. Therefore the computation can resume from there. Optional acknowledgement messages of levels from 0 to N−1 may be provided for the head node A.

In detail: The head node or first node A in a level L0 sends out a message msg1 to anode B in an adjacent level L1 in step S1 and keeps in a step S0 the sent message msg1 in its output queue. Upon successful receiving the message msg1 by the node B in the first level L1 an optional acknowledgement-level-0-message ack-0 in a step S1a may be provided for the message msg1 by the node B to the head node A. The node B processes data of the message msg1 and generates based on the data of msg1 and the processing of this data a message msg1' which is sent in a second step S2 to the adjacent node C in the next higher level L2. Upon successful receiving of the message msg1' from node B the node B sends in a further step S2a an acknowledgement message of level 0 ack-0 for the message msg1' back to the node B. Upon receipt of this ack-0 acknowledgement message for the message msg1' by node B, node B by optionally sends in a step S2b an acknowledgement message ack-1 of level 1 for the message msg1 to the head node A on level 0.

Node C on level L2 then processes data of the message msg1' and generates based on the data of message msg1' a message msg1" and sends this message msg1" in a third step S3 to node D on the next higher level L3. The tail node D does not send a new message based on this message msg1" so node D is the called tail node. The tail node D on level L3 then sends an acknowledgement message of level-0 for the message ack-0 msg1" in a further step S3a back to the node C on level L2. Based on this acknowledgement message ack-0 of level-0 for message msg1" the node C sends an acknowledgement of level-1 message ack-1 for message msg1" in a further step S3b to the node B on level L1. Upon receiving of this acknowledgement message of level 1 ack-1 for message msg1" node B may perform a check point procedure i.e. saves its node state. A node state may also be saved on a regular basis, for instance every seconds, instead of being triggered by an arrival of an acknowledge message. This means whenever node B saves its node state, node B can send a level-2 acknowledgement message after reception of the acknowledgement message of level-1. After performing the check point procedure cp node B on level L1 sends in a further step S3c an 2-level acknowledgement message ack-2 for the message msg1 back to the head node A. Since in FIG. 2 a 2-level acknowledgement system is described the head node A then removes in a fourth step S4 the message msg1 from its output queue.

Check pointing means that the node state is saved but in particular not the message that flow through the node itself so that its state or status can be restored on a new node in case of a failure. Further no coordination between the check points of individual nodes is required. In FIG. 2 the acknowledgement system together with a check pointing enables the robustness towards the failure of N=2 consecutive nodes in the chain along the topology of nodes A→B→C→D. The head node A keeps the messages in its outgoing queue until it gets a 2-level acknowledgement for them, meaning in that all data sent by node A was computed by intermediate nodes B and C and eventually received by node D, the tail node. When for example nodes B and C fail at the same time they will be replaced with new nodes and computation will be start from the last check point image registered by nodes B and C. When nodes along the chain fail computation restarts from the last saved check point: Previous nodes have the messages in their outgoing queues and a check point of the state of the nodes before it failed is retrieved and uploaded to the spare nodes replacing the nodes that failed. Optionally acknowledgements of level from 0 to N−1 back to the head node A of the topology may be sent. Further redundancy of the head node A might be provided for further robustness.

For instance when having the following topology:

A→B→C→D→E and with implementation of a level-1 acknowledgement system it is still ensured that in case both nodes B and D simultaneously fail the system is still available since nodes B and D are not consecutive nodes. Similarly if a level-2 acknowledgement system is implemented then the above mentioned system is robust against any failure involving pairs of adjacent nodes, for example node B and node C or node C and node D.

Figure 3:
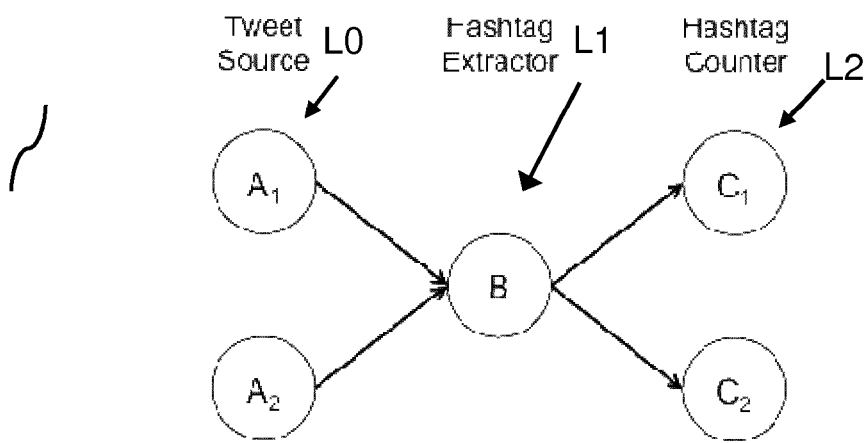
FIG. 3 shows a topology of computing nodes of a system according to a second embodiment of the invention.

FIG. 3 shows a topology of computing nodes of a system according to a second embodiment of the second invention.

In FIG. 3 an example of a topology of computing nodes with implemented level-1 acknowledgement system is shown.

In FIG. 3 the topology describes a general implementation of a computation algorithm, for instance source nodes A1 and A2 are sources of TwitterTweets and feed an intermediate node B performing some transformation of the original data, for example node B extracts hashtags from the tweets. In turn the intermediate node B pushes the results to some nodes $C_1$ and $C_2$ which run some algorithm on the data they receive from node B, for example they count the occurrence of the hashtags.

The nodes A1 and A2 are head nodes on level L0, the intermediate node B is on level L1 and the nodes $C_1$ and $C_2$ on level L2 are tail nodes.

In detail node $A_j$, j=1; 2 sends a message to intermediate node B and keeps a copy of its outgoing message in its output queue. The intermediate node B acknowledges the received message from node $A_j$ with a level-0 acknowledgement message addressed to node A. After node $A_j$ has acknowledged the message, the intermediate node B processes it and builds a new message or messages that depending on the algorithm may be send to the tail nodes $C_k$. Intermediate node B keeps copies of each transmitted message in its corresponding output queue similarly to node A. Messages to be send towards the node $C_k$ are matched with an identifier of the message received from node $A_j$ that triggered their generation: A message received from node $A_j$ may trigger the generation of multiple messages for example of a number K.

Upon receiving an acknowledgement message of level-0 ack-0 from tail node $C_k$, the intermediate node B looks up its output queue, finds the message being acknowledged and performs the following operations:
1. Determine an identification information IDXX of the original message from Aj that triggered the transmission of the message that is being acknowledged;
2. Increment a counter of the number of downstream nodes that have acknowledged the said message from Aj whose identification information is IDXX;
3. If the message of identification information IDXX has been acknowledged by all the said K involved downstream nodes, the corresponding ack-1 message to send it to the upstream node Aj is prepared; and
4. If the node has a checkpoint of its status performed after message received from Aj whose identification information is IDXX was processed, then send the corresponding ack-1 to the upstream node.

Once the upstream node $A_j$ receives the acknowledgement message of level-1 ack-1 node $A_j$ removes the corresponding message from the queue.

Each node may perform the same set of actions whenever it receives an acknowledgement message of level 0 ack-0 from downstream node(s). The tail node generates all the acknowledgement messages from level-0 to level-N as soon as it processes the message as after that node there is no more computation to be done. In this way the nodes on the levels below, i.e. the ones before the level-1 acknowledgement case, can remove the messages from their corresponding output queues.

To store a checkpoint a distributed storage system may be used. The above mentioned operations 1. 2. and 3. are required as the intermediate node B might generate multiple messages for a given incoming message or simply forwarding it to multiple nodes depending on the topology. Therefore it must be kept track of all incoming messages contributing to the generation of an outgoing message and vice versa within the node.

A heartbeat protocol or an expiration of a timeout on the acknowledgments can be used as indicator of a node failure and start the procedure to recovery, which may comprise the following steps:
1. Picking up a new node, and migrate on it the status of the node that failed wherein the status is saved on a robust distributed storage system;
2. Alerting the neighbor nodes to redirect the traffic towards the new node, starting from the messages for which no acknowledgement has been received;
3. The new node, once it is ready to receive messages, can send an acknowledgement related to the last message being part of its checkpoint. This acknowledgement will prevent the upstream node to re-send messages that are already part of the current checkpoint but the node that failed could not acknowledge them because it failed right after the checkpoint but right before sending the acknowledgments.

The operation of check pointing on a node is only needed if the computation on that node depends on the current state of the node itself. Check pointing can be done periodically and can be performed in an incremental fashion so that only the difference between the previous status or state and the current one is saved. Upon check pointing, cumulative acknowledgments can be sent to save bandwidth and reduce the amount of messages being exchanged between nodes.

Figure 4:
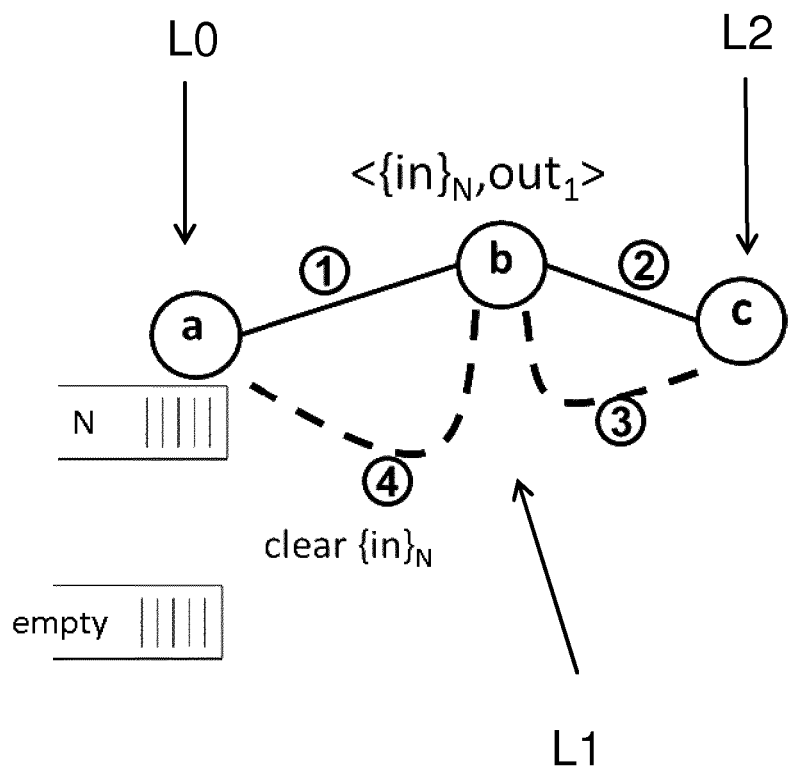
FIG. 4 shows a topology for a conventional system together with a conventional message flow.

FIG. 4 shows a topology for a conventional system together with a conventional message flow.

In FIG. 4 a conventional distributed computing system is shown with a sequential topology comprising a head node a, an intermediate node b and a tail node c on the levels L0, L1 respectively L2. Node a sends out messages to node b and node b implements an average operation and sends the processed result to node c.

In detail: Node a sends N messages in step 1 to node B and node B keeps a message relation $<\{in\}_N, out_1>$ of all of them before sending outputs messages out to node c in step 2 including the value of the average of that N messages. Only when node c has received that output message of node b it sends an acknowledgement message in step 3 back to node b and node b can in turn send the acknowledgement message in step 4 back to node a. Then it can remove all the N messages from its queue (clear$\{in\}_N$). Until then, node b saves the information that all the N messages have contributed to the generation of the output message and must all be kept in the output queue of node a. Therefore input-output-mapping relations must be kept in node a's queue requiring a lot of memory and slowing down the computation.

Figure 5:
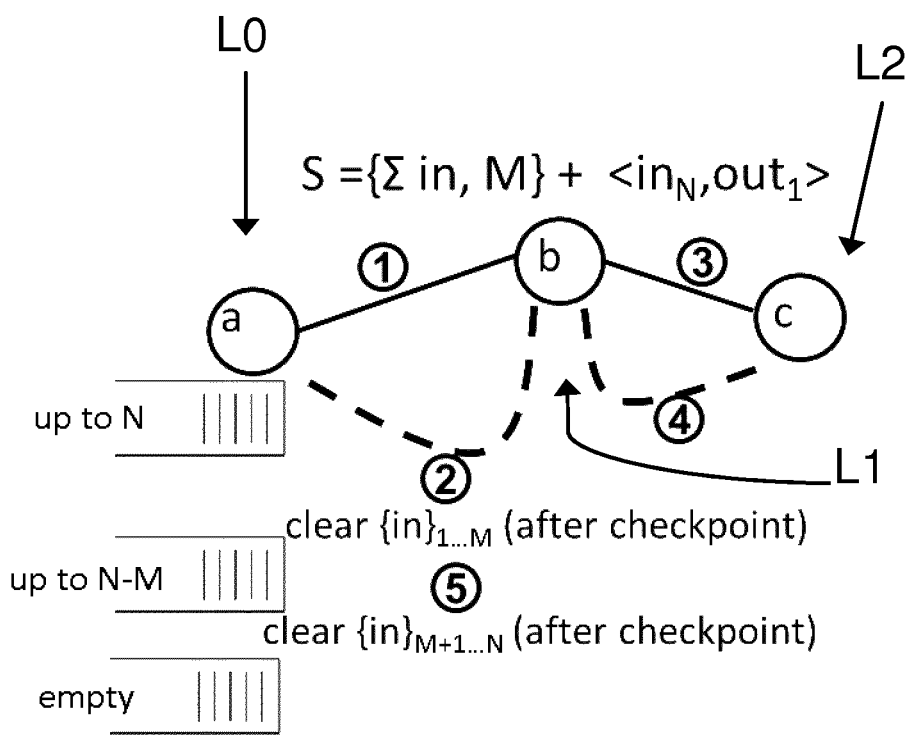
FIG. 5 shows a topology with message flow of a method according to a third embodiment of the present invention.

FIG. 5 shows a topology according to FIG. 4 with message flow of a method according to a third embodiment of the present invention.

In FIG. 5 a topology according to FIG. 4 is shown. Node b implements again an average operation. While node a transmits messages in step 1 to node b, node b collects status information S=$\{\Sigma in, M\}$, comprising the sum of the values of the messages being received so far, and the number of messages M being received so far. Additionally, it keeps information about the mapping between the output message and the only input message that triggered that output message $<in_N, out_1>$. As only the N-th message will generate an output message, node b can send back in step 2 acknowledgements to node a after it has checkpointed its status, so that node a can start removing messages from its output queue clear $\{in\}_{1 \ldots M}$ earlier than e.g. in the case of the upstream backup technique according to FIG. 4.

When node b has received the N-th message which is the only one that effectively triggers node b to send out the message to node c in step 3, it only keeps the mapping information $<input_N, output>$ and once both the following conditions are met:
1. If it has received the corresponding acknowledgement message from node c in step 4 and
2. It has checkpointed its status.

Then node b can inform node a to remove clear$\{in\}_{M+1 \ldots N}$ all the remaining messages from its output queue. Thus memory on the nodes is saved and the number of retransmissions is reduced in case of failure leading to an increased overall network input/output efficiency. This is in particular useful in distributed processing platforms running applications with a high arrival message rate.

In summary the present invention provides a combination of a level N-acknowledgement system and a checkpoint mechanism to resume the computation on a node by keeping intermediate results of the computation along the topology. The present invention further provides a checkpoint technique and a level N-acknowledgement system used by two consecutive neighbor nodes to keep track of which message can be removed from a node queue.

The present invention has inter alia the following advantages: Due to the combination of a level N-acknowledgement system and a checkpoint mechanism, computation on a node may be resumed without the need of redundant computation. The present invention further enables high availability allowing fast resuming and saving of network input/output and CPU consumption. The present invention further enhances robustness wherein the level of robustness is configurable, i.e. flexible, preferably when the value of N kept reasonable low as it is unlikely that consecutive nodes fail assuming node failures are independent between each other.

Further the present invention enables distributed computing systems to handle node failure and resume the computation without introducing redundant computation or possibly have to restart the whole topology from scratch. Further the present invention may be applied to the chain replication area as it enables the neighbors to resume the forwarding of messages from the node which is right after the one that failed, instead of starting from the head node of the chain again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a distributed computing system comprising a plurality of nodes, wherein the nodes are connected in a general network topological sequential manner resulting in M-levels, wherein M is a natural number greater than or equal to 3, and wherein each level, comprises at least one node, the method comprising:
    when sending data in messages via nodes on different levels, storing on a first node, a first message which was sent by the first node;
    removing the first message from the first node only if an N-level acknowledgement message is received by the first node indicating that a second message based on the data of the first message was successfully received by a second node on a second level, wherein the difference between the values for the first and second level is a predefined value N, wherein N is a natural number smaller than or equal to the maximum number of levels between the first and second level; and
    saving a node state of at least one of the second node and a third node on a level higher than the first level before sending out an acknowledgement message to a node on a level below if an outgoing message towards the second node is generated based on the node state;
    saving, by one of the plurality of nodes, an incoming message with data triggering a generation of an output message based on the data of the received incoming messages for the output message; and
    receiving, by a X-level node, a Y-level acknowledgement message from a node in an adjacent higher level X+1;
    checking, by the X-level node, whether all messages sent out to nodes in the adjacent higher level have been acknowledged; and
    if all messages sent to nodes in the adjacent higher level have been acknowledged, a Y+1-level acknowledgement message is provided to one or more nodes on the adjacent lower level X−1 when the state of the node in level X has been saved.

2. The method according to claim 1, further comprising providing, for every transmitted message between nodes in adjacent levels, a 0-level acknowledgement message to the one or more nodes which sent out the message.

3. The method according to claim 1, wherein upon detection of a failure of at least one of the N nodes, the saved node state is restored on a spare node replacing the failed node and the nodes on the adjacent lower level are providing their stored messages to the spare node.

4. The method according to claim 3, wherein neighbor nodes of the failed node are informed about the failure and traffic redirection to the spare node is initiated.

5. The method according to claim 3, wherein the spare node sends an acknowledgement message to a node on an adjacent lower level related to the last message being part of the saved node state.

6. The method according to claim 1, wherein failure of a node is detected at least one of by a heartbeat protocol or by expiration of a timeout on receiving acknowledgement messages for sent messages.

7. The method according to claim 1, wherein the saving of the node state is performed at least one of periodically or incrementally.

8. The method according to claim 1, wherein the node state is saved on a distributed storage system.

9. The method according to claim 1, wherein cumulative acknowledgement messages are sent when saving the node state.

10. The method according to claim 1, wherein the first node is provided in a redundant manner.

11. The method according to claim 1, wherein the node state of a node is saved before providing an acknowledgement message to a node on a lower level.

12. The method according to claim 1, wherein message identification information provided by a sending node is used for checking.

13. A distributed computing system comprising:
    a plurality of nodes operable to send data in messages via nodes on different levels,
    wherein the plurality of nodes are connected in a general network topological sequential manner resulting in M-levels, each level comprising at least one node, wherein M is a natural number greater than or equal to 3, wherein a corresponding message sent by the first node is stored on the first node and only removed from the first node if an N-level acknowledgement message is received by the first node indicating that a second message based on the data of the first message was successfully received by a second node on a second level, wherein the difference between the values for the first and second level is a predefined value N, wherein N is a natural number which smaller than or equal to the maximum number of levels between the first and second level, and wherein a node state of at least the second node or a third node on a level higher than the level of the first level is saved before sending out an acknowledgement message to a node on a level below, if an outgoing message towards the second node is generated based on the node state, wherein at least one of the nodes saves an incoming message with data triggering a generation of an output message based on the data of the received incoming messages for the output message wherein upon receiving a Y-level acknowledgement message from a node in an adjacent higher level X+1, the node in the level X checks whether all messages sent out to nodes in the adjacent higher level have been acknowledged and if all messages sent to nodes in the adjacent higher level have been acknowledged, a Y+1-level acknowledgement message is provided to one or more nodes on the adjacent lower level X−1 when the state of the node in level X has been saved.

* * * * *